Oct. 14, 1941.    S. K. WELLMAN    2,259,094
METHOD FOR MAKING BODIES OF COMPACTED POWDERED MATERIAL
Filed Jan. 9, 1939    3 Sheets-Sheet 3

INVENTOR
Samuel K. Wellman
BY Ray S. Gehr
ATTORNEY

Patented Oct. 14, 1941

2,259,094

UNITED STATES PATENT OFFICE 2,259,094

METHOD FOR MAKING BODIES OF COMPACTED POWDERED MATERIAL

Samuel K. Wellman, Cleveland Heights, Ohio, assignor to The S. K. Wellman Company, Cleveland, Ohio, a corporation of Ohio Application January 9, 1939, Serial No. 249,899

1 Claim. (Cl. 29—160.5)

This invention relates to a method for making bodies of compacted powdered material or of mixtures of such materials and is especially applicable to the production from metal powders, or mixtures of powdered metal and other powdered materials, of such articles as antifriction bearing members and friction brake and clutch linings or facings.

In the production of such bodies of compacted powdered material and especially of materials including metals, the body, after being formed, is subjected to a heat treatment to effect sintering for the purpose of securing increased strength and other desirable properties. Prior to such sintering, the bodies of compacted material, while strong enough to permit ordinary handling, are relatively weak and frangible as compared with the sintered product.

In the usual manufacturing practice, the body is formed by compressing the constituent powdered materials in the cavity of a suitable mold or die structure and then removing from the die the article thus formed. The compressed body is sufficiently weak and friable to be easily broken or abraded while it is being forced from the cavity of the mold. The breakage of such bodies at this stage of manufacture has constituted a very serious difficulty and the primary object of the present invention is to provide a method by which bodies may be formed of compressed powdered materials and withdrawn from the mold or die without the customary breakage which has usually accompanied such removal.

A further object of my invention is to provide apparatus which is especially suitable for carrying out the above method.

My invention has grown out of the discovery that the objectionable breakage above referred to is due in large measure to the tendency of the bodies of compacted powdered material to expand in size following the removal of the compacting pressure. The amount of such expansion on each dimension is approximately proportional to the magnitude of the dimension. While such expansion is relatively slight and of little significance in the case of small dimensions, when dimensions of greater magnitude are involved, the expansion is proportionately greater and may be very considerable. For example, in the case of a facing or a clutch plate or ring compacted in a 12" diameter mold, an expansion of nearly 3/32" on the diameter has been observed.

I have found that if the expansion of such bodies is permitted to occur while the body is yet partially confined by the walls of the mold, internal stresses are created which tend to produce distortion of those portions of the body which lie between the confined peripheries. This distortion, in the case of disk shaped bodies having their peripheries confined, has been observed to take the form of bulges, wrinkles, cracks, etc., while in a few instances where the stresses were more uniformly distributed through the material, the body has been observed to dish outwardly, the center portion moving out of the plane of the edges to form a shallow cone.

Under some conditions, however, the internal stresses set up by this expansion tendency may not be relieved by distortion, due usually to the application of external forces which oppose and prevent the distortion. However, when these opposing forces are eventually removed, the expansion occurs with the consequent formation of the above mentioned defects. For example, when a plurality of stacked disc-shaped compressed bodies are removed from the compression mold by pushing them out of one end of the mold, the axial pressure needed to so push them out may be sufficient to prevent any dishing, warping, or bulging of the bodies while they are still within the mold, but when a disc has been pushed to the open end so that a portion of it extends outside the mold, that portion which is no longer confined by the walls of the mold will tend to expand, while the balance of the disc is still prevented by the mold from such expansion. The result is that the edges of the disc crack, spall, or crumble. This has been the customary defect observed in a large proportion of the compressed bodies which have been removed from the mold in this manner. Furthermore it is a defect which has seriously hindered commercial operations, since breaking or chipping of the edge ordinarily prevents further use of the article, especially where the mold cavity has been designed to produce a body which is very close to the size of the element desired in the finished product. For this reason, the defect has caused much waste of time, labor, and material, and consequently has created a serious problem which heretofore has not been solved.

Now I have discovered, however, that the expansion in question can be delayed for any length of time after the compressed body has been removed from the mold or from those walls of the mold which directly oppose the expansion. This can be accomplished by applying pressure to the body, and particularly by applying it to those portions of the faces of the body which lie adjacent the said opposing walls of the mold. The pressure should be applied in such a direction that it exerts a component which is perpendicular to the direction in which the major expansion of the compressed body tends to occur.

My improved method of manufacture is based upon the discovery last referred to and I have devised apparatus especially adapted for manufacture by the improved method. Several forms of this apparatus are shown in the accompanying drawings and reference is now made to them since explanation of the apparatus at this point will aid in the further explanation of the invention.

In the drawings, Fig. 1 is a vertical section taken through a hydraulic press, and showing a compression mold mounted in operative position thereon and holding a charge of the powdered material to be compressed.

Figs. 4 and 5 are plan and elevation, respectively, of a type of multipart mold from which compressed articles may be removed in accordance with the invention disclosed herein, while Fig. 6 is an elevation of one of the halves of the mold.

Figure 1:
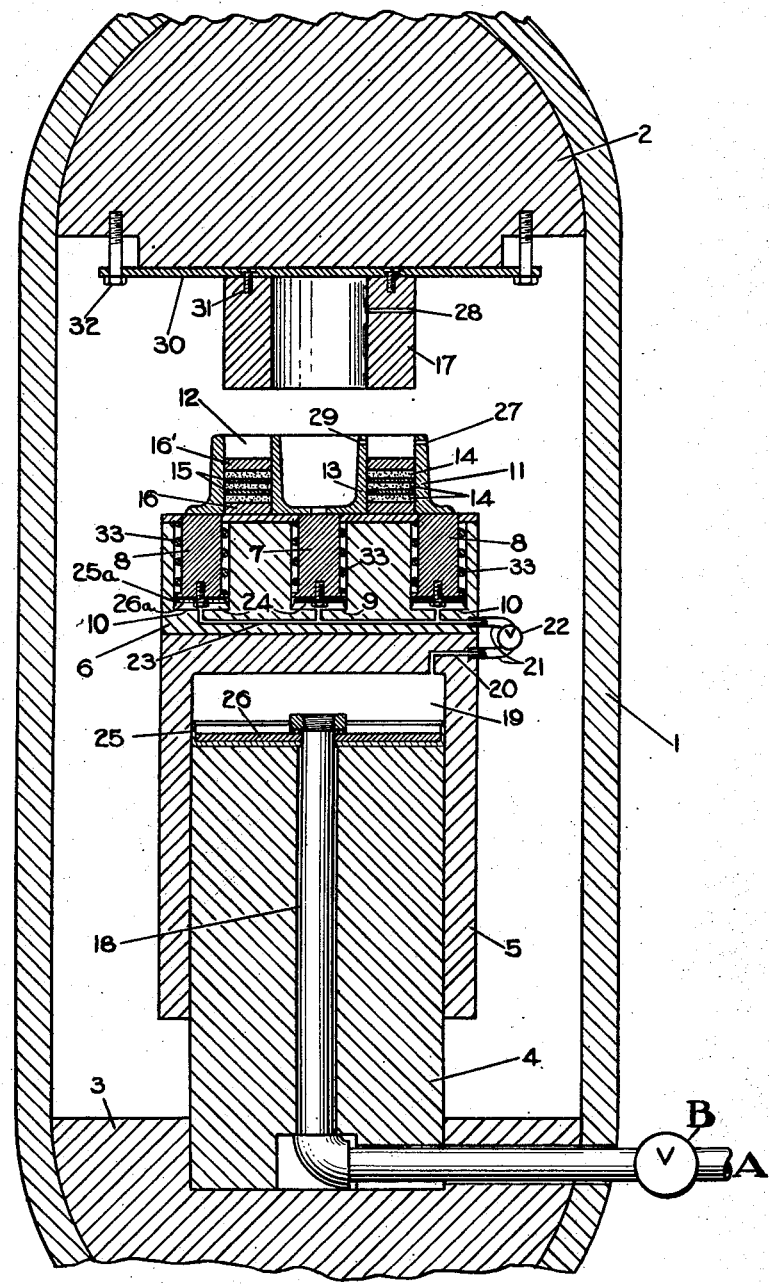

Since a variety of shapes may be formed with the apparatus shown in the drawings, by providing an appropriately shaped mold, it will be understood that the specific molds shown in the drawings are used merely for purposes of illustration.

In the figures, in which like parts bear like numerals, 1 is the press main-frame joining the stationary press head 2 with base 3. Base 3 supports stationary piston 4 on which is guided main hydraulic cylinder 5. On the surface of cylinder 5 rests stripping head designated generally by the numeral 6 which is suitably centered thereon, and secured by appropriate means well known to those skilled in the art. Positioned within the stripping head 6 are a plurality of pistons 7 and 8, 8 capable of being raised by hydraulic pressure, or otherwise, in the corresponding cylinders 9 and 10, 10, respectively, each being surrounded by a compression spring 33.

On the stripping head is disposed a forming mold or die comprising outer ring 11, core member 13 and bottom and top compression rings 16, 16', said mold having an annular chamber or cavity 12 between the parts 11 and 13. The mold parts are so positioned on the surface of stripping head 6 that the outermost pistons 8, 8 may, when raised, contact the outer mold ring 11 without entering chamber 12; and so that central piston 7 may, when raised, contact core member 13. A stationary compression ram 17 is rigidly secured to press head 2, as through bar 30, screws 31 and 32, and is so shaped as to enter the mold cavity 12 when main cylinder 5 is raised toward press head 2.

Chamber 12 is partially filled with powdered metal mixture 14 distributed alternately between spacer rings 15, the whole pile being closed top and bottom with the heavy compression rings 16' and 16. It will be obvious, of course, that a plurality of such layers of powder may be included, or a single layer alone. The number which may be so formed depends on the travel of the press, the thickness of the individual layers making up the pile, the compressibility of the powder, the depth of the mold, and the frictional characteristics of the powder against the mold walls.

Hydraulic fluid under pressure is admitted from any suitable pump or pressure reservoir through conduit A to main valve B and then through conduit 18 into chamber 19 which is formed between piston 4 and cylinder 5. An opening 20 in cylinder 5 permits hydraulic fluid to flow from chamber 19 through conduit 21 as far as valve 22 when the latter is closed. When it is opened the fluid may then pass through conduit 23 into chambers 24 beneath pistons 7 and 8, 8, where it may act thereon to force each of them upwardly toward press head 2.

It will, of course, be apparent that instead of supplying hydraulic fluid to valve 22 from chamber 19, it may equally well be supplied directly from main conduit A or from a separate pump or reservoir. In either of these constructions, however, flexible high pressure connections must be used in order to accommodate the vertical movement of cylinder 5 with its attached stripping head 6. The arrangement shown in Figs. 1 and 2 therefore has the advantage that such connections are avoided.

Pistons 4, 7 and 8, 8 are each provided with the usual gaskets 25 and 25a, respectively, which seal the piston and cylinder assemblies against leakage of the hydraulic fluid. The gaskets are suitably reinforced by retainer plates 26 and 26a which are in turn secured to the pistons.

Mold members 11 and 13 and ram 17 are provided with small holes 27, 28 and 29, respectively, the purpose of which will appear in a later part of the description.

Having now described one form of apparatus which may be used, its operation will be explained in terms of a specific application. The method of operation and the apparatus are applicable to a wide variety of shapes and compositions, but the production of friction clutch rings will serve to illustrate the operations involved.

In preparing the press for operation, an appropriate stripping head is mounted on the main cylinder, the stripping head being chosen so that its pistons 7 and 8, 8 are properly spaced to fit the mold members 11 and 13 which are to be used. A proper stationary ram 17 is fitted to the press head. Cylinder 5 and pistons 7 and 8, 8 are then lowered by opening valves B and 22, respectively, and when the latter pistons are in their lowermost positions, valve 22 is closed. The press is then ready for use.

Mold members 11 and 13 are assembled upon a work plate with bottom compression ring 16 spacing them apart, and are rotated relative to each other until holes 27 and 29 are brought into axial alignment on a line radial to the mold cavity. A charge of suitable mixed powder is then weighed out. Such a charge may be composed, for example, of the following ingredients:

| | Per cent |
|---|---|
| Cu | 70.9 |
| Pb | 10.9 |
| Sn | 6.3 |
| Graphite | 7.4 |
| Air-blown silica | 4.5 |

The charge is poured into chamber 12 and there thoroughly distributed upon the surface of ring 16 so as to form a thin layer of uniform thickness. A spacer ring 15, conforming precisely to the shape and dimensions of cavity 12, and having been ground so as to have plane parallel surfaces and uniform thickness throughout, is then admitted into chamber 12 and gently eased into position on top of the powder layer. A second weighed charge is then added, and distributed, and the above procedure repeated. After a suitable number of charges have been added, the top compression ring 16' is inserted on top of the last powder layer. The charges are then ready to be compacted in the press.

Figure 2:
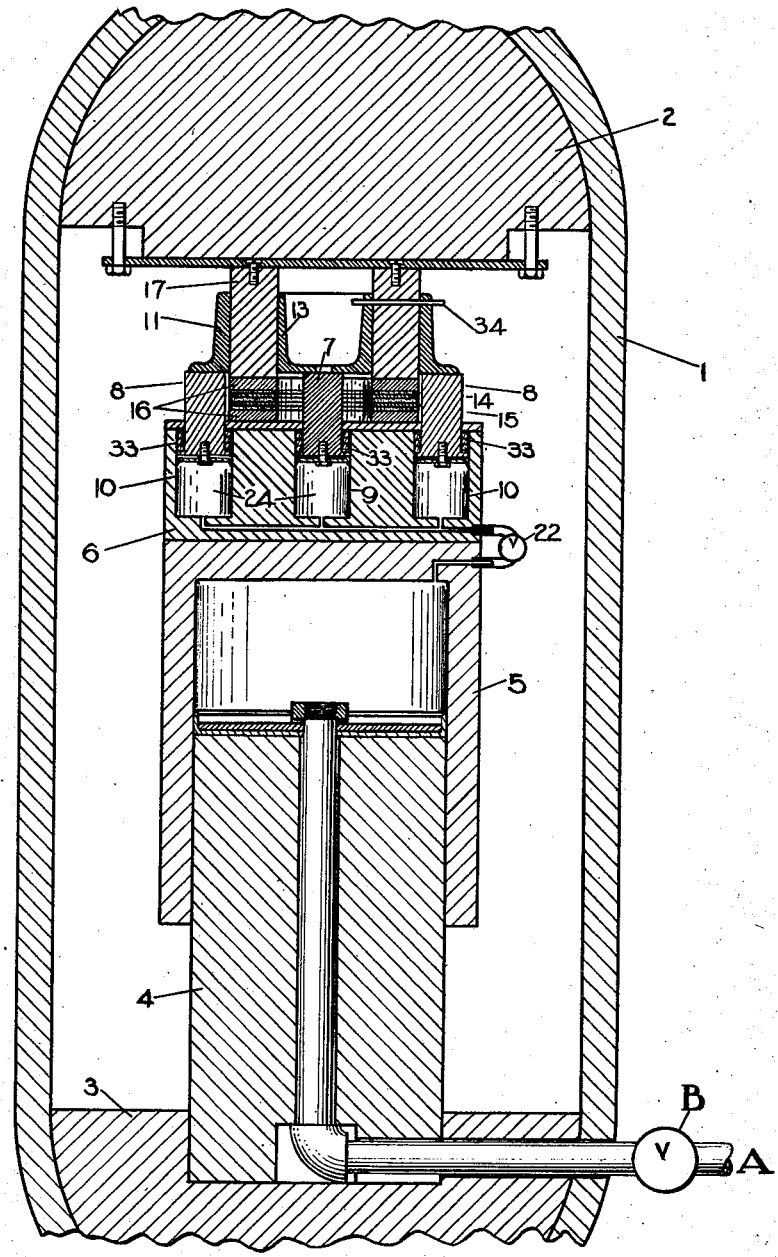
Fig. 2 is a similar cross-section showing the side walls of the mold stripped from around the compressed articles.

The charged mold assembly is now transported to the press and is positioned on the surface of stripping head 6, its position thereon being adjusted so that cavity 12 is in alignment with ram 17, and so that holes 27, 28 and 29 are in alignment in the same vertical plane. Valve B is opened slightly to admit hydraulic fluid into chamber 19 under main cylinder 5 whereupon the mold assembly is forced upwardly until ram 17 enters the compression cavity and contacts upper compression ring 16'. The movement is made slow so that air in the cavity and in the charge may be permitted to escape without disturbing the layers of powder. Main valve B is then opened wide to subject the charge to full compression pressure. For the above composition, suitable full pressure has been found to be about 22,000 pounds per square inch. It will be appreciated, of course, that this value is merely illustrative, since with any given composition, the pressure may be varied widely depending on the properties which are desired in the sintered article. After this predetermined pressure has been attained, and the layers of powder have been compacted the desired amount, valve 22 is cracked to allow hydraulic fluid to escape into cylinders 9 and 10, 10. The valve is manipulated in such manner that the pressure exerted on the charge by the main cylinder is maintatined not much below the desired compression pressure, i. e., 22,000 pounds per square inch. The fluid permitted to escape from chamber 19 through valve 22 gradually accumulates in cylinders 9 and 10 and forces pistons 7 and 8, 8 upwardly against the bases of mold members 11 and 13, respectively. As the pressure under these cylinders gradually increases, mold members 11 and 13 are forced upwardly and away from the charge 14, 14 until the full charge is exposed to view. It should be particularly noted at this point that with proper manipulation of valve B and 22 the charge will have been held under full compression pressure even though fluid has been withdrawn from beneath the main cylinder and passed into the stripping head. When the mold members 11 and 13 have reached such a height above the charge that holes 27, 28 and 29 are in axial alignment, a pin 34 is inserted through them. This condition is shown in Fig. 2. The main hydraulic pump is now stopped and with valve B open, the fluid in chambers 19 and 24 is permitted to be forced out by the springs 33 surrounding pistons 7 and 8, 8 and by the weight carried by cylinder 5, until these parts are again in their normal positions. Mold members 11 and 13 remain suspended around ram 17 from pin 34, while the charge in cavity 13 remains on the surface of stripping head 6 and is lowered away from ram 17.

The charge is now free of pressure and may be removed from the press. The compressed bodies are separated from separator rings 15 and 16 after being brushed free from any adhering loose powder, are ready to be sintered or otherwise treated.

Returning again to the press, cylinder 5 is now raised until stripping head 6 again contacts die members 11 and 13 and supports them. The pin 34 which was passed through holes 27, 28 and 29 is now withdrawn and cylinder 5 lowered, whereupon mold members 11 and 13 become separated from ram 17 and are again ready for assembly in preparation for another charge.

In the above described procedure, while the mold side walls 11 and 13 are being stripped from the charge the compressed bodies 14 are maintained under sufficiently high pressure at right angles to their faces and preferably out to their outer peripheries, to insure that the internal expansive stresses in the compressed bodies are counteracted sufficiently by the frictional forces thus established to prevent expansion of said bodies when they are moved out of engagement with the restraining mold walls. In other words, no expansion of the compressed bodies is permitted until they have been entirely removed from contact with the restraining side walls of the mold and, consequently, when the pressure upon the faces of the compressed bodies is later removed and radial expansion of said bodies is permitted, there is nothing to restrain such expansion in any part of the compressed body so that there is no tendency to fracture the edge parts thereof in the manner which has characterized the prior methods of manufacture. The intensity of the pressure needed to secure this result in any particular case will depend upon the various factors indicated in the foregoing description. The remarkable restraining effect of the pressure to which the faces of the disk-shaped bodies are subjected is visually demonstrated in a striking manner in the procedure which has been described, for as the said pressure is released the compressed disks may be seen to expand radially beyond rings 15 and 16. Furthermore, by the simple expedient of holding the compressed bodies under pressure after the side walls of the mold have been stripped from them, the expansion of the compressed bodies can be delayed or prevented for any desired length of time.

Figure 3:
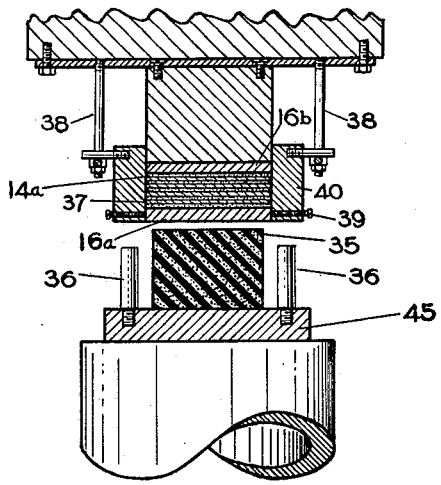
Fig. 3 is a fragmentary vertical section showing a stripping device in which rubber pads are compressed against the charge during the stripping operation.

It will be understood that the stripping head may take a variety of forms since its pistons must necessarily be placed in conformity with the molds or dies which are to be used on it. Furthermore, it is not necessary that hydraulic pressure be used to strip the molds. For example, one form of stripping head which may be used is shown in Fig. 3, in which the pressure applied on the compressed bodies is obtained by compressing the rubber pad 35, while the mold members are pushed upwardly by fingers 36. The operation of this device is obvious. After the charge 37 has been compressed, but before main cylinder 5 has been lowered, hooks 38 are attached to the mold assembly and screws 39 inserted into ring 16a from mold member 40. The main cylinder is then lowered, and the stripping head 45 placed thereon. The cylinder is now again raised, and enough rubber pads inserted under the charge that appreciable compression of them will occur before fingers 36 contact mold member 40. The cylinder is now raised until fingers 36 touch and support mold 40. Screws 39 are removed, and hooks 38 loosened. Now on raising the cylinder further, mold 40 is forced upward and stripped from around the charge, while rubber pads 35 compress more and more against the charge. To complete the operation, mold 40 is now hooked in its uppermost position, the cylinder lowered to relieve the pressure on the charge, and the charge removed.

While this type of stripping device accomplishes the desired results, its use requires many press operations which consume much time. The hydraulic stripper, on the other hand, is easier to use and is much faster. Because of these advantages the hydraulic device is to be preferred for commercial operations.

In connection with the use of rubber pads for stripping, it is to be noted that while the compressed charge is hooked up against the ram, and before the stripper has been raised to exert pressure on the charge, the charge may be under very little pressure. Even so, however, no damage to the compressed bodies occurs during stripping since pressure is again applied to them before the mold wall is stripped off.

In connection with stripping it is to be pointed out further that the pressure which need be exerted against the charge during stripping is small. Indeed, it need only be the value obtained by multiplying the value of internal stress in the compressed body by the coefficient of friction between the body and the material of the separator. Obviously, if a separator material is used which has a low coefficient of friction with the body, the pressure needed to prevent expansion may be relatively large, while if the separator material against the compressed body has a large coefficeint of friction, the pressure will be proportionately small. In practice, using high carbon steel separators with the powder composition given above, pressure as low as 1000 pounds per square inch can be used.

Figure 4:
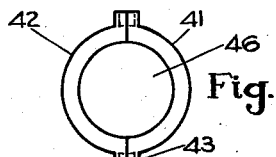
Figures 5, 6:
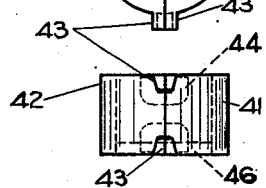
Figure 7:
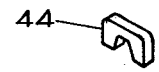
Fig. 7 is a perspective view of a clamp suitable for use with the mold of Figs. 4, 5 and 6.
Figure 8:
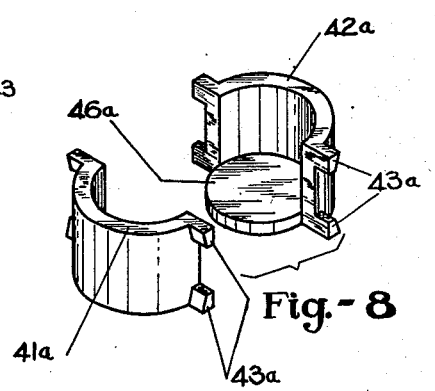
Fig. 8 is an expanded isometric view of a modification of the mold shown in Figs. 4–6, in which the base of the mold is made integral with one of the side wall sections.

The method of this invention may also be practiced without using any sort of stripping head, as for instance, with multipart or sectional molds such as are represented by the mold assembly shown in Figs. 4, 5, 6 and 8. Figures 4, 5 and 6 show a sectional mold wall comprising a plurality of sections 41 and 42 adapted to fit together to form the desired shape of compression cavity. Each section carries a number of lugs 43 so positioned as to cooperate with similar lugs on adjacent sections, whereby a clamp 44 may be tightly fitted therearound to hold the sections together. Such a mold assembly may have the bottom separate from the sides as at 46 in Figs. 4 and 5, or integral with one side wall as in the modified construction shown in Fig. 8, where the mold comprises sections 41a and 42a with clamp lugs 43a, and section 42a is formed with a bottom wall section 46a.

When using this type of mold shown in Figs. 4 to 8, the ram is forced into the open upper end of the mold cavity to compress the charge. After the charge has been compressed, the compression pressure may be held at its maximum value or reduced to that pressure which will just prevent expansion, or to any intermediate value. The clamps 44 may then be knocked off of the lugs 43 or 43a, and one of the mold sections, such as 41 or 41a, removed or stripped away. The pressure may then be fully released and the compressed bodies removed. Obviously, when the mold sections are of irregular shape, the portion or portions of the mold which must be removed as described will be such as to permit the compressed body to expand freely when the pressure is released.

It will be understood that the various modifications described above have been chosen merely to illustrate the invention, and should not be regarded in a limiting sense since other modifications are possible within the bounds of the following claim, which indicates the scope of the invention.

What I claim is:

The method of making a thin flat briquette composed of powdered materials which are predominantly metallic and which, when compressed to form the briquette, impart to the briquette a tendency to expand along its major dimensions when the compacting pressure under which it is formed is released, said method comprising the steps of: providing a mold having a continuous and unjointed peripheral cavity wall and two mutually opposite walls both of which are disposed transversely to the peripheral cavity wall and one of which is movable toward the other to exert pressure on powdered metallic material surrounded by the peripheral wall; charging the aforesaid powdered material into the mold cavity to form therein a layer which may be compressed to the desired thickness between said opposite walls; moving one of the opposite mold walls toward the other and pressing with a pressure of more than a 1000 lbs. per square inch the powdered material within the mold to press the latter against the peripheral cavity wall and to compact and form it into a coherent briquette; continuously clamping at least the peripheral portions of the briquette between the said opposite walls of the mold under a positive pressure sufficiently great to prevent substantial expansion of the peripheral boundary of the briquette when the said peripheral cavity wall has been removed from restraining contact with the periphery of the briquette, said clamping pressure being not less than about 1,000 pounds per square inch and not more than the compacting pressure used in forming the briquette; effecting removal of the said unjointed peripheral cavity wall from all restraining contact with the periphery of the briquette while the latter is continuously clamped as aforesaid, by displacing the peripheral cavity wall parallel to the thickness of the briquette; and thereafter releasing said briquette from said clamping pressure to allow it to expand.

SAMUEL K. WELLMAN.